Dec. 12, 1950      K. E. FRASER      2,533,449
COFFEE METERING DEVICE
Filed July 25, 1947
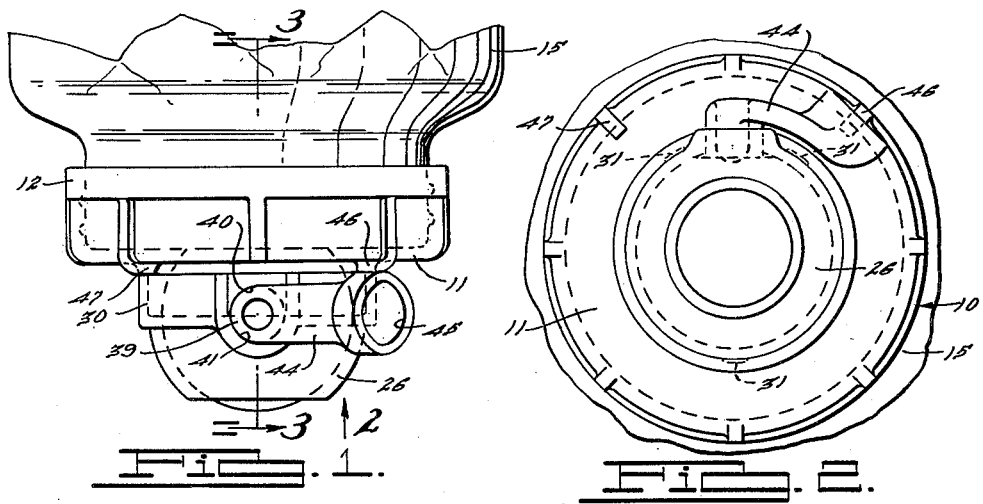
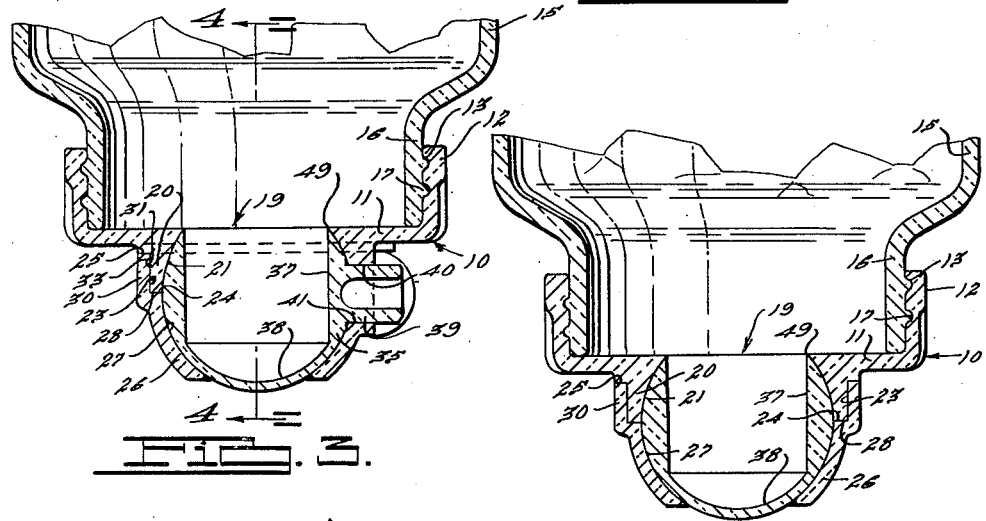
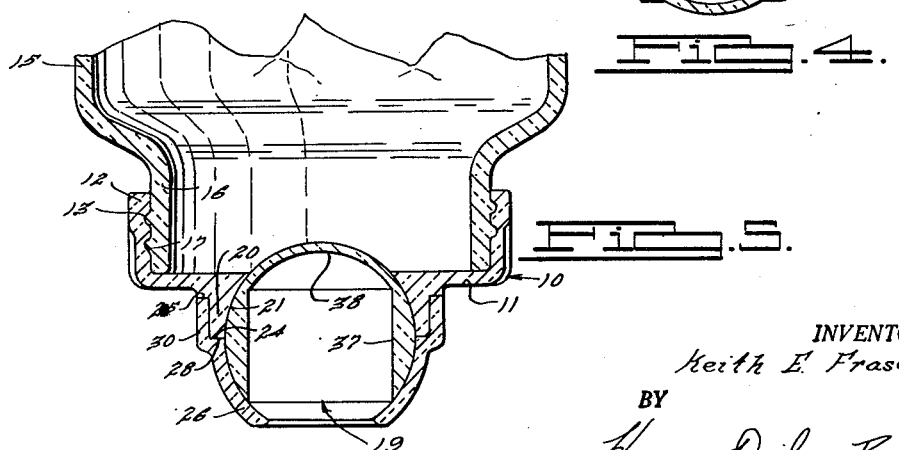
INVENTOR.
Keith E. Fraser.
BY
Harness, Dickey & Pierce.
ATTORNEYS.

Patented Dec. 12, 1950

2,533,449

UNITED STATES PATENT OFFICE 2,533,449

COFFEE METERING DEVICE

Keith E. Fraser, Detroit, Mich.

Application July 25, 1947, Serial No. 763,479

1 Claim. (Cl. 222—364)

The invention relates to dispensing devices and it has particular relation to a device for dispensing ground coffee in measured quantities.

At the present time ground coffee is supplied in various types of containers including glass jars having ordinary screw type caps. In the preparation of the coffee beverage, various measuring devices are employed by housewives, such for instance as tablespoons, and the use of such measuring devices involves some inconvenience and furthermore it is difficult to measure the amount of coffee accurately.

The present invention is concerned with a simple and easily operated dispensing device for ground coffee which may be readily attached to a glass jar containing the coffee. The device is of such character that it can be threaded on to the open end of the container in place of the ordinary cap provided for the container, and includes a turnable cup element which when turned into one position, is open to the interior of the container so that it may be filled with coffee. Then upon turning the cup through approximately one-half turn, the open end of the cup is directed in the opposite direction and dispenses the coffee into the receptacle in which the coffee is made. Turning of the cup element is accomplished by means of a handle which may be easily flipped from one position to another so that the cup element may be easily filled with ground coffee and the coffee discharged therefrom.

One object of the invention therefore is to provide a simple, inexpensive and easily operated coffee dispensing device for use in a home or the like so that ground coffee may be quickly discharged in accurately measured quantities.

Another object of the invention is to provide a device of the character stated which includes a minimum number of parts which may be quickly and easily assembled and disassembled.

Another object of the invention is to provide a device such as designated which includes means for effecting a jarring of the coffee so as to facilitate loading of the cup element and discharging of the coffee therefrom.

Another object of the invention is to provide a coffee dispensing device which is so constructed that particles of finely ground coffee will not normally be allowed to enter between relatively movable surfaces or interfere with such relative movement.

Other objects of the invention will become apparent from the following specification, from the drawings relating thereto and from the claims hereinafter set forth.

For a better understanding of the invention reference may be had to the drawings wherein:

Figure 1 is a side elevational view of a coffee dispensing device constructed according to one form of the invention as seen when attached to the lower end of a glass coffee jar.

Fig. 2 is a bottom view of the structure shown in Fig. 1 as viewed in the direction indicated by the arrow in the latter figure.

Fig. 3 is a cross sectional view taken substantially along the line 3—3 of Fig. 1.

Fig. 4 is a cross sectional view taken substantially along the line 4—4 in Fig. 3.

Fig. 5 is a cross sectional view like Figure 4 excepting that the cup element is shown in its discharging position.

Referring to the several figures, the device illustrated comprises a cap element 10 having a base 11 and an annular rim 12 provided with threads 13. The cap element is adapted to be secured to a glass coffee jar 15, having a neck portion 16 provided with threads 17 which fit the threads on the wall 12 of the cap. Thus the cap element takes the place of the ordinary closure or cap on the jar.

The central portion of the base 11 of the cap element is open as indicated at 19 and around this opening, the base has an annular, outwardly projecting flange 20 which is formed with a truncated spherical inner surface 21. The outer surface of the flange 20 is cylindrical as indicated at 23 and at its outer end joins a flat end face 24 directed radially of the cylindrical surface. A similar, radial surface or shoulder 25 is provided at the inner end of the cylindrical surface.

The truncated-spherical surface 21 forms part of a spherical socket which is completed by a second cap element 26 having a complemental, inner truncated-spherical surface 27. Location of the cap element 26 is effected by an annular, internal shoulder 28 which abuts the end surface 24 on the flange 20 and a cylindrical wall 30 which telescopes over and substantially fits the cylindrical surface 23 of such flange. Also, the inner end of the wall 30 substantially abuts the surface 25. The two parts of the socket may be held together in various ways but preferably a releasable engagement is provided by circumferentially spaced beads or buttons 31 on the surface 23 of flange 20 and cooperating depressions 33 in the inner surface of the wall 30. Three of these buttons or recesses may be provided, for example, as shown in Fig. 2. The two parts of the socket may be assembled merely by forcing the cap element 26 over the flange 20 and during this movement, the wall 30 snaps over the buttons 31 so as to cause the buttons to enter the recesses 33.

A cup element 35 is disposed in the socket now provided and this cup element has a truncated-spherical outer surface substantially fitting the spherical socket. The inner surface of the cup is defined by a cylindrical wall 37 joining a truncated-spherical bottom 38 and as seen in Fig. 3, the cup is open upwardly to receive coffee from the jar. In order to turn the cup element, it is formed with a trunnion 39 which projects outwardly in parallel relation to the base 11 and radially with respect to the center of the socket so that turning of the cup will occur about an axis passing through the center of the sphere. As best shown by Fig. 1, the flange 20 has a semicircular recess 40 closely but turnably one-half of the trunnion 39 and the cup element 26 has a semi-circular recess 41 similarly receiving the remainder of the trunnion. These two recesses thus provide a cylindrical opening in which the trunnion is journalled. It is to be observed that this arrangement holds the cup in such position that it can turn only about one axis and this axis is so related to the opening in the cup that the axis of the cylindrical surface 37 is perpendicular to the trunnion axis.

At its outer end, the trunnion 39 is integral with a handle 44 which terminates at its outer end in a recess 45 of such shape as to receive the end of a person's finger therein. Thus by inserting the end of the finger, the handle may be easily moved and the cup turned about the axis of the trunnion. It will be noted particularly in Figs. 1 and 2, that the base 11 of the cap 10 has raised portions 46 and 47 which are so located that when the handle is in one extreme position, it will engage one raised portion and when in the other extreme position, it will engage the other raised portion. The arrangement is such that when the handle is in engagement with the raised portion 46, the open end of the cup 35 will be directed upwardly so as to receive coffee from the jar and when the handle is in engagement with the raised portion 47, the open end of the cup will be directed downwardly to discharge coffee, as seen in Fig. 5.

With the cup 35 in the position as shown by Fig. 3, coffee from the jar 15 normally will flow downwardly into the cup but it is to be understood that when the cup is moved to this position by flipping the handle 44 and causing the end thereof to strike the raised portion 46, the coffee will be jarred to facilitate the flow of coffee into the cup. With the cup now filled with ground coffee, it may be discharged downwardly by turning the handle. At this point it may be observed that the edge of the base 11 around the opening in the latter is substantially sharp as indicated at 49 so that particles of coffee will not tend to enter between the spherical surfaces. Movement of the handle 44 through approximately a one-half turn, now turns the cup 35 into the position shown by Fig. 5 and discharge of the coffee from the cup element will be facilitated by causing the handle to strike the raised portion 47 rather sharply so as to dislodge any coffee that tends to stay in the cup. This movement of the handle can be effected quickly and the striking of the end of the handle against the two raised projections will normally occur since the operator will usually flip the handle from one extreme position to the other. Thus accurately measured cups of coffee can be discharged very rapidly by anybody flipping the handle repeatedly through its range of movement.

The device preferably is constructed of a suitable plastic and the several parts can be assembled readily by snapping the two socket elements together after positioning the cup element between them. This manner of assembling the parts also makes it possible to clean the device readily by disassembling such parts. It has been mentioned that the cup element, trunnion and handle are integral but the handle may be made separately and then assembled with the trunnion in any suitable manner.

Although only one form of the invention has been illustrated and described in detail, it will be apparent to those skilled in the art that various modifications may be made without departing from the scope of the claim.

What I claim is:

A device for dispensing finely-divided material, comprising a cap adapted to be fastened to a container for the material and including a base having an opening therethrough, the wall surface adjacent the opening being an annular spherical segment with its outer edge lying approximately on a plane passing through the center of the sphere and its inner edge defining said opening, a one-piece molded cup and trunnion element having an external spherical surface fitting said annular spherical surface and having a radially extending trunnion, said cup element having a cylindrical recess extending into the cup element from one side, the axis of the cylinder being at right angles to the axis of the trunnion and extending through the center of the cup element sphere, the diameter of said cylindrical recess being approximately equal to the diameter of the inner edge of the annular spherical segment of the cap, a retaining member secured to the cap member and having an opening therein, the wall surface of the retaining member adjacent said opening being an annular spherical segment fitting said cup element with its inner edge lying approximately on said plane and its outer edge defining said opening in the retaining member, said opening in the retaining member being of less diameter than the diameter of said cylindrical recess in said cup member, the annular spherical segments on the cap member and retaining member having notches which receive and journal said trunnion, and a handle mounted on said trunnion for rotating said cup.

KEITH E. FRASER.

REFERENCES CITED

The following references are of record in the file of this patent:

UNITED STATES PATENTS

| Number | Name | Date |
| --- | --- | --- |
| 1,560,013 | Angeletti | Nov. 3, 1925 |
| 2,104,332 | Rohde et al. | Jan. 4, 1938 |
| 2,127,465 | Church | Aug. 16, 1938 |

FOREIGN PATENTS

| Number | Country | Date |
| --- | --- | --- |
| 202,705 | Great Britain | Aug. 20, 1923 |